United States Patent [19]

Harnish et al.

[11] Patent Number: 5,004,790

[45] Date of Patent: Apr. 2, 1991

[54] FLUORINATED SURFACTANT MONOMERS FOR POLYMER SURFACE MODIFICATION

[75] Inventors: Daniel F. Harnish, Morristown; Donald Pickens, Mendham; Andrew M. Zweig, West Orange, all of N.J.

[73] Assignee: Allied-Signal Inc., Morris Township, Morris County, N.J.

[21] Appl. No.: 311,316

[22] Filed: Feb. 15, 1989

[51] Int. Cl.$^5$ .............................................. C08F 12/20
[52] U.S. Cl. ...................................................... 526/242
[58] Field of Search .......................................... 526/242

[56] References Cited

U.S. PATENT DOCUMENTS

| | | | |
|---|---|---|---|
| 3,720,639 | 3/1973 | Griffith | 528/110 |
| 3,852,222 | 12/1974 | Field et al. | 528/48 |
| 3,879,430 | 4/1975 | O'Rear et al. | 568/811 |
| 3,965,074 | 6/1976 | Middleton | 526/242 |
| 4,157,358 | 6/1979 | Field et al. | 528/70 |

OTHER PUBLICATIONS

S. Sasaki et al., Synthesis and Properties of Cured Epoxy Resins Containing the Perfluorobutenyloxy Group, vol. 22, pp. 831–840 (1984).

*Primary Examiner*—Joseph L. Schofer
*Assistant Examiner*—N. Sarofim
*Attorney, Agent, or Firm*—Roger H. Criss

[57] ABSTRACT

A novel class of fluorinated surfactant monomers which when blended and cured with conventional non-fluorinated monomers produces resins with dramatically modified surfaces. Resins which may be thus modified include urethanes, epoxides, acrylates, polyesters and other thermosetting materials.

7 Claims, No Drawings

FLUORINATED SURFACTANT MONOMERS FOR POLYMER SURFACE MODIFICATION

BACKGROUND OF THE INVENTION

1. Field of the Invention

This invention relates to blends of fluorinated and non-fluorinated thermosetting monomers and resultant cured products used to produce resins with modified surfaces.

2. Description of the Prior Art

The fluorinated diol of structure

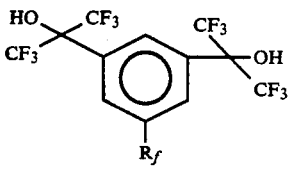

where $R_f = H$ or $C_nF_{2n+1}$ for $n = 1-18$
has proven to be a highly useful intermediate for the production of various thermosetting resins. For example, when reacted with an excess of epichlorohydrin it produces a diglycidyl ether which may be crosslinked with polyfunctional amines to produce a fluorinated epoxy resin (see U.S. Pat. No. 3,879,430). When reacted with a stoichiometric quantity of epichlorohydrin and another diol it produces a fluorinated polyol which may be crosslinked with polyfunctional isocyanates to produce a fluorourethane (see U.S. Pat. No. 3,720,639, U.S. Pat. No. 3,852,222, U.S. Pat. No. 4,157,358, and commonly assigned, co-pending U.S. patent application Ser. No. 277,089, filed Nov. 28, 1988). When reacted with the appropriate acid chloride, it produces a diacrylate or dimethacrylate which may be polymerized to produce the corresponding fluorinated acrylate or methacrylate resin (see U.S. Pat. No. 4,356,296). When the diglycidyl ether of the fluorinated diol is reacted with acrylic acid or methacrylic acid, it produces yet a different diacrylate or dimethacrylate which may be polymerized to fluorinated resins (see commonly assigned co-pending U.S. patent application Ser. No. 263,152, filed Oct. 26, 1988 now U.S. Pat. No. 4,914,171). In other words, the fluorinated diol above may be used as an intermediate to produce a variety of difunctional fluorinated monomers which may be polymerized to produce a variety of fluorinated resins.

The properties of these fluorinated resins are similar to both those of the corresponding non-fluorinated resin and those of a fluoropolymer. In general the thermal and chemical properties of the fluorinated resin are similar to the non-fluorinated material and seem to depend primarily on the chemical linkages produced during polymer formation. On the other hand the fluorinated resins possess a number of properties similar to common fluoropolymers—low moisture absorption, low moisture permeation, low surface energies, low dielectric constants, low index of retraction, low coefficients of friction, and many others—when compared to their non-fluorinated analogues.

The usefulness of the fluorinated resins discussed above depends primarily on their more unique fluoropolymer properties. Application of these resins as oil and water repellents, as biological anti-fouling materials, as marine coatings, as cladding for optical fibers, as low dielectric materials for electronic application, as adhesives, as moisture barrier coatings, as wear reducing agents and many others are possible. In some cases the application of the fluorinated resins depends upon their bulk properties (such as required for electronic and optical applications) and in other cases their application depends on surface properties (such as oil and water repellency or antifouling applications).

For many practical applications the use of the fluorinated resins is restricted by either or both of two factors. First, in order to achieve high levels of fluoropolymer like properties the difunctional monomers used to make the resins must contain fluoroalkyl groups, $R_f$, of significant length (e.g. $n = 6$ to $10$). The molecular volume occupied by these groups reduces the cross-link density of the fluorinated resins as compared with many corresponding non-fluorinated resins. As a result, many of the physical properties of the fluorinated materials, such as tensile strength, hardness, glass transition temperature, etc. are reduced when compared with non-fluorinated counterparts. Secondly, the fluorinated resins tend to be quite expensive. The preparation of the basic fluorinated diol intermediate discussed above requires the use of both hexafluoroacetone and perfluorinated alkyl iodide ($C_nF_{2n+1}$ I) both of which are costly reagents. Many processing steps and material manipulations are required to introduce the perfluoroalkyl group to the diol, and each of these contribute to yield loss in the overall process (see, e.g. U.S. Pat. No. 3,879,430).

For applications of the fluorinated resins which depend upon their bulk properties, it is difficult or impossible to overcome the deficiencies of reduced cross-link density or cost. For applications which depend upon the surface properties of the resins, however, this is not the case. It would be desirable to provide compositions which are characterized as having fluoro-resin surface properties yet provide bulk properties of non-fluorinated resins. It would also be desirable to provide compositions which are characterized as having fluoro-resin surface properties yet which may be produced at greatly reduced costs.

SUMMARY OF THE INVENTION

In accordance with this invention, there is provided a composition comprising a blend of at least one functionalized fluorinated monomer with at least one co-reactive non-fluorinated monomer, the fluorinated monomer being derived from compounds of the formula:

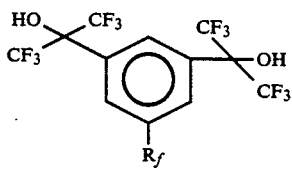

where $R_f = H$ or $C_nF_{2n+1}$ for $n = 1-18$

Also in accordance with this invention, there is provided a resin obtained by the reactive curing of a composition comprising a blend of at least one co-reactive functionalized fluroinated monomer and at least one co-reactive non-fluorinated monomer, the fluorinated monomer being derived from compounds of the formula

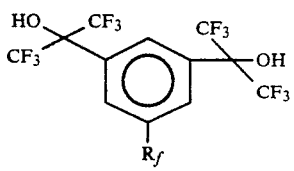

where $R_f$=H or $C_nF_{2n+1}$ for n=1−18

It has been found that when one of the fluorinated monomers is blended and polymerized with a compatible, co-reactive non-fluorinated monomer, a composition is formed which has the surface characteristics of the fluoro-resin and the bulk characteristic of the non-fluorinated resin.

In the case of urethane resins the fluorinated monomer is comprised of the polyols of structure

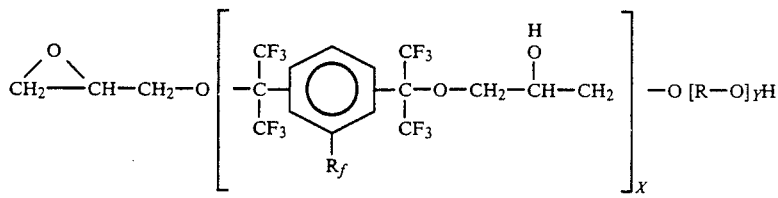

where X+Y=2−16, X≠0 and
where $R_f$=H or $C_nF_{2n+1}$ for n=1−18
and where R is (a) an aliphatic radical, preferably —(CH$_2$)$_n$— for n=2−8 or —(CH$_2$—CHXO)$_n$ for n=1−3 and X=H or CH$_3$, or (b) an aromatic radical, preferably derived from resorcinol, or bisphenol A.

or (c) a cycloaliphatic radical, preferably derived from cyclohexanediol or cyclohexane-dimethanol.

or (d) a fluorinated radical, preferably a fluorinated aliphatic or aromatic radical of the formula:

—CH$_2$(CF$_2$)$_3$—CH$_2$— or —CH$_2$CH$_2$(CF$_2$—CF$_2$)$_n$—CH$_2$CH$_2$— for n=1−4

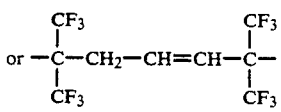

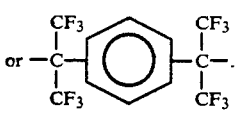

The non-fluorinated monomer may be one of many common, commercially available polyols, and the urethane resin is produced by reacting the blend of fluorinated and non-fluorinated polyols with a polyisocyanate.

In the case of acrylate resins the fluorinated monomer has the structure

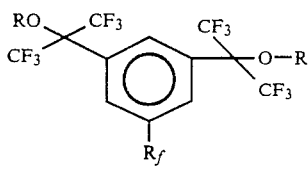

where $R_f$=H or $C_nF_{2n+1}$ for n=1−18 and R is —C(=O)—CX=CH$_2$ or —CH$_2$—CH(OH)—CH$_2$—O—C(=O)—CX=CH$_2$ where X is H or CH$_3$ The non-fluorinated monomer may be one of many common commercially available acrylate or methacrylate monomers, and the acrylate resin is produced by polymerizing the blend of fluorinated and non-fluorinated monomers with heat or light in the presence of a free radical initiator, or other conventional curing procedure.

In the case of epoxy resins the fluorinated monomer has the structure

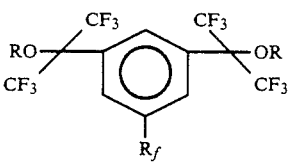

where $R_f$=H or $C_nF_{2n+1}$ for n=1−18
and R has the structure

—CH—CH—CH$_2$ (epoxide)

or —CH$_2$—CH(OH)—CH$_2$—NH(R')NH$_2$ where R' is a lower aliphatic (e.g., 2 to 6 carbon atoms) or aromatic (e.g., 6 to 12 carbon atoms) radical such as ethylene or toluene or is derived from one of many common polyfunctional amines. The non-fluorinated monomer may be one of many common, commercially available epoxides, and the epoxy resin is produced by thermally curing the blend of fluorinated and non-fluorinated monomers with one of any common epoxy curing agents such as an amine, anhydride, or homopolymer catalytic agent.

The use of many other functionalized monomers derived from the above fluorinated diol are considered within the scope of this invention. This fluorinated diol above may be derivatized to form fluorinated monomers possessing allylic, vinyl ether, styrenic, or other functional groups. These fluorinated monomers may be blended and polymerized with other compatible, co-reactive non-fluorinated monomers to produce compositions having fluoro-resin surface characteristics.

DESCRIPTION OF THE PREFERRED EMBODIMENTS

As monomers, the functionalized derivatives of the diol

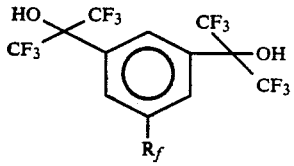

where $R_f = H$ or $C_nF_{2n+1}$ for $n = 1-18$
such as the epoxides, acrylates, and polyols are unique in that their high fluorine content provides them a surface active characteristic. In many regards these materials can be considered to be "surfactant monomers". When cured or polymerized as neat monomers they produce fluoro-resins with many of the physical properties of common fluoropolymers. When blended and cured from the liquid phase with non-fluorinated monomers their surface active characteristic causes them to segregate at the resin surface and hence provide fluoro-resin surface properties.

A "surfactant monomer" may be defined as a material which will reduce the surface or interfacial tension of the liquid phase of a co-reactive monomer system. In this regard the surfactant monomer is analogous to soap in a soap/water solution. For thermodynamic reasons some of the surfactant segregates to the liquid surface of the mixture and the total system energy is reduced. When the monomer system is cured or polymerized, the surfactant monomer is reacted with the co-reactive monomer and is bound at the surface of the solid resin that is produced.

Several criteria seem to be important for a surfactant monomer to perform its function. It must be solubilized in the liquid phase with the co-reactive monomer and must be sufficiently mobile from a diffusional point of view to allow for its segregation at the liquid surface. It must not phase separate or become dispersed from the co-reactive monomer during cure. If it is not soluble in the liquid phase, but only dispersed, a two phase resin system would be formed on curing and the fluorinated monomer would not preferentially be at the surface of the cured resin.

As used herein, the term "co-reactive" means that the monomer contains the same or compatibly reactive radical groups with the other monomer.

The blends and resins of this invention preferably comprise about 0.01 to about 25% by weight of the fluorinated monomer, more preferably about 0.01 to about 10% by weight of the fluorinated monomer, and most preferably, about 0.1 to about 3% by weight of the fluorinated monomer. The blends and resins may be produced by any conventional procedure.

Functionalized monomers derived from the fluorinated diol above may be regarded as surfactant monomers. Their high fluorine content, particularly for preferred structures where the fluoroalkyl group is $C_6F_{13}$— or $C_8F_{17}$—, provides them with surfactant characteristics. Reactive, solubilized derivatives which will not separate on curing may be synthesized for most co-reactive monomers. Resins produced from blends of the fluorinated surfactant monomer with co-reactive non-fluorinated monomers have fluoropolymer surface characteristics and demonstrate all the properties associated with low energy surfaces. In addition, the present blends and resins can be produced at significantly lower costs than an all-fluorinated system, These and other benefits of the fluorinated surfactant monomer will become apparent in the following non-limiting examples.

EXAMPLE 1

In Example 1 the effect of a fluorinated polyol on the surface tension of a solution of a non-fluorinated polyol is demonstrated. The fluoropolyol (I) was prepared by the method of U.S. Pat. No. 3,720,639 and had a number average molecular weight of 6600 and a hydroxyl content of 1.45 meq/g.

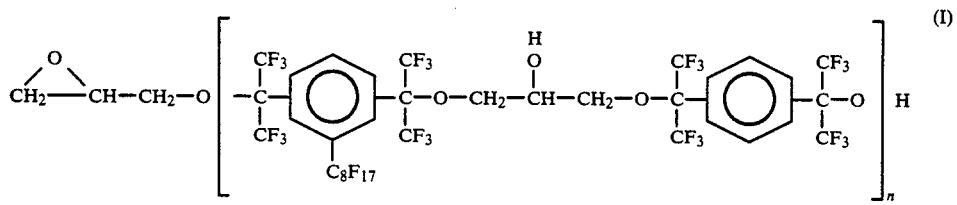

Blends of (I) with Desmophen 800, a solvent-free, saturated polyester polyol with a hydroxyl number of 290 available from Mobay Chemical were prepared by mixing the components together at room temperature, such that the total polyol content was 50 or 75 wt % in methyl isobutylketone (MIBK) solution. The surface tensions of these solutions were determined by the Wilhelmy balance method, and the results are presented in Table 1.

TABLE 1

| Wt % Fluoropolyol[1] | Surface Energy[2] (dyne/cm) | |
|---|---|---|
| | 50% Solids | 75% Solids |
| 0 | 25.5 | 30.6 |
| 1 | 23.1 | 24.5 |
| 5 | 22.5 | 24.3 |
| 100 | 22.7 | — |

[1] Wt % fluoropolyol based on total polyol content
[2] Surface tension for MIBK solution with total polyol contents of 50 and 75%, respectively.

The rapid drop in surface tension is indicative of the surface activity of the fluorinated polyol and implies its concentrated presence at the surface.

EXAMPLE 2

In Example 2 the effect of fluorinated polyols on the surface energy of a urethane resin is demonstrated. In this example the blend of fluorinated and non-fluorinated polyols from Example 1 were crosslinked with Desmodur N75, an aliphatic diisocyanate available from Mobay Chemical with a functional equivalent weight of 254, using dibutyltin dilaurate as a catalyst. The polyols, isocyanate, and catalyst were mixed in MIBK solution and were dipcoated and air dried on a glass slide. The surface energy of the cured, dried resin was determined by the critical surface tension method. The atom percent fluorine on the surface was determined by X-ray Photoelectron Spectroscopy (ESCA). The results are presented in Table 2.

TABLE 2

| Wt % Fluoropolyol[1] | Surface Energy (Ergs/cm$^2$) | Atom % F at Surface |
| --- | --- | --- |
| 0 | 35 | 0 |
| .03 | 22 | 34.4 |
| .05 | 22 | 39.3 |
| 1.00 | 22 | 41.3 |
| 2.00 | 22 | 41.2 |
| 10.00 | 22 | 41.5 |
| 100.00 | 22 | 41.5 |

[1] Weight percent of total polyol content

Comparing this data with that of Example 1 indicates that at low concentrations of fluoropolyol in the solution mixture of polyols, isocyanate and catalyst, the fluoropolyol is driven to the surface due to the surface active nature of the $C_8F_{17}$ group. As solvent evaporates and the resin begins to cure, the fluorinated polyol remains concentrated at the surface and becomes bound to the bulk non-fluorinated polyol. Based on atom percent fluorine at the surface and on the surface energy measurement, it would appear that the surface is nearly 100% fluorourethane, as would be produced by curing neat fluoropolyol with the same isocyanate. This is surprising in that such results are achievable with only about 0.03% of the fluorinated monomer.

EXAMPLE 3

In Example 3 the effect of various fluoropolyols on the surface energy of urethane resins is demonstrated. The oil and water repellancy of these resins as determined by contact angle measurement is also indicated. In this example the fluoropolyols of Table 3 were prepared either by the method of U.S. Pat. No. 3,720,639 or U.S. Pat. No. 3,852,222. Polyols in this table have the structure:

$$CH_2\overset{O}{\diagup\diagdown}CH-CH_2-O[R_1-OCH_2-\overset{\overset{H}{|}}{\underset{|}{C}}H-CH_2]_x-O-[R_2O]_y-H$$

TABLE 3

| Polyol No. | $R_1$ | $R_2$ |
| --- | --- | --- |
| II | $R_3$ | $R_4$ |
| III | $R_3$ | $-CH_2(CF_2)_3CH_2-$ |
| IV | $R_3$ | $-(CH_2)_4-$ |
| V | $R_3$ | 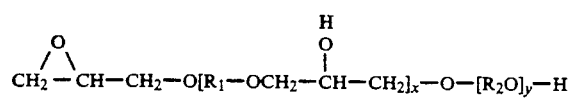 |
| VI | $R_4$ | $-(CH_2)_4-$ |
| VII | 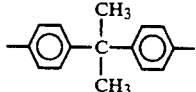 | $-(CH_2)_4-$ | where $R_3$ is

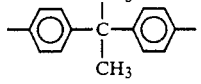

and where $R_4$ is

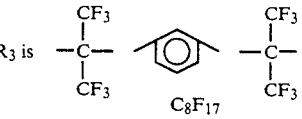

Each of the polyols of Table 3 was blended with Desmophen 650A, a 65% solids polyester polyol available from Mobay in MIBK solution. These blends were then mixed with Desmodur N75 and dibutylin dilaurate and the resultant solution dip coated on glass slides and air dried and cured to form a urethane resin. The contact angles of water and mineral oil and the surface energies of these resins are shown in Table 4.

TABLE 4

| Polyol No. | Wt. %[1] Polyol | Surface Energy (dyne/cm) | Contact Angle (°) Water | Contact Angle (°) Oil[2] |
| --- | --- | --- | --- | --- |
| II | 0 | 43 | 70 | 18 |
|  | 1 | 21 | 85 | 49 |
|  | 3 | 18 | 75 | 57 |
|  | 5 | 18 | 81 | 62 |
| III | 1 | 18 | 86 | 57 |
| IV | 1 | 18 | 86 | 89 |
| V | 1 | 17 | 83 | 63 |
| VI | 1 | 23 | 78 | 42 |
| VII | 1 | 32 | 70 | 21 |

[1] Weight percent of total polyol content
[2] Nujol oil

As indicated in Example 3, the addition of Polyol II to the non-fluorinated system causes a dramatic decrease in the surface energy of the urethane resin produced. Simultaneously, the surface became non-wetted by both water and oil. For Polyols II, III, IV, and V, all of which have relatively high fluorine content, the impact on surface properties at 1% loading is substantial. The oil and water repellancy produced by these materials is considerable. Even for Polyol VI, which has less fluorine, the impact is significant. For a polyol of similar structure, but with no fluorine (Polyol VII), impact on surface properties is minimal or non-existent.

EXAMPLE 4

Example 4 demonstrates that the surface activity of the fluorinated surfactant monomers is not restricted to just a resin/air surface but that it is sensitive to the resin interface with any low energy surface. In this example the blend of fluorinated polyol, non-fluorinated polyol and isocyanate of Example 2 was used to dip coat both a glass slide and a polytetrafluoroethylene (PTFE) thin plate. After cure and dry, the coating was peeled from the substrate and the fluorine content of all resin interface surfaces was determined by ESCA with the following results presented in Table 5.

TABLE 5

| Substrate | Atom % F @ | |
|---|---|---|
| | Air Interface | Substrate Interface |
| Glass | 41.2 | 0.0 |
| PTFE | 41.3 | 53.1 |

As indicated the fluorine content is high for both air interfaces and for the resin surface produced against PTFE. This latter observation implies a high degree of wetting of the low energy PTFE surface by the fluoropolyol. Conversely, the fluorourethane does not wet the high energy glass surface, and this interface is more stable to the presence of the non-fluorinated polyol.

EXAMPLE 5

This example shows the effect of a fluorinated acrylate surfactant monomer on the surface tension of a non-fluorinated liquid acrylate and on the surface energy of cured resins produced from this acrylate mixture.

The fluoroacrylate:

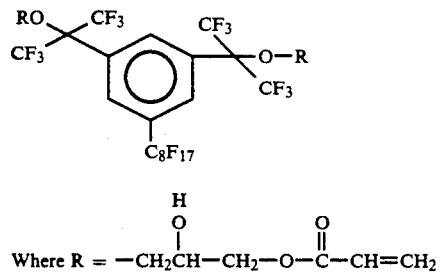

Where $R = -CH_2CH-CH_2-O-C-CH=CH_2$ with OH and C=O substituents was prepared by the addition of acrylic acid to the corresponding diglycidyl ether material. (See co-pending U.S. patent application Ser. No. 263,152). This fluorinated acrylate is totally miscible with conventional, non-fluorinated acrylates such as trimethylolpropane tri-acrylate (TMPTA) and mixtures of these materials may be directly cured by electron beam at 3 megarads or by UV light (using 2,2-diethoxyacetophenone as a photoinitiator) to produce clear, glossy coatings. Table 5 shows both the surface tension of the liquid mixtures prior to cure and the surface energy of the cured coatings.

TABLE 5

| Wt. % Fluoropolyol | Surface Tension Liquid Mixtures (dyne/cm) | Surface Energy Cured Coating (erg/cm$^2$) |
|---|---|---|
| 0 | 40.0 | 37 |
| 0.05 | 38.2 | 29.4 |
| 0.10 | 37.5 | 22.4 |
| 0.50 | 34.2 | — |
| 1.00 | 32.3 | 19.4 |
| 5.00 | 28.5 | 19.2 |

As was the case with fluoropolyol solutions and the urethane resins, the impact of fluoroacrylates on both surface tension and surface energy is non-linear. It would appear that the fluorinated monomer is concentrated at the liquid mixture surface and is bound there when cured.

EXAMPLE 6

Example 6 shows the effect of a fluorinated amine surfactant monomer on the surface properties of an epoxy resin. The fluorinated amine

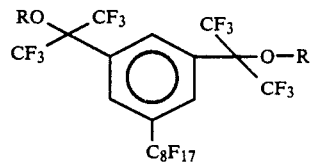

where $R = -CH_2CH-CH_2-NHCH_2-CH_2-NH_2$ with OH substituent.

was prepared by the addition of ethylene diamine to the corresponding fluorinated diglycidyl ether. A 50% solution of this material in isopropyl alcohol was blended with the diglycidyl ether of bisphenol A to form a clear liquid phase. Mixtures of these materials were thermally cured (50° C. for 16 hours) with the appropriate molar equivalent quantity of ethylenediamine to form epoxy resins. Surface energies and water and oil contact angles for these resins are shown in Table 6.

TABLE 6

| Wt. % Fluoroepoxide[1] | Surface Energy (erg/cm$^2$) | Contact Angle (°) | |
|---|---|---|---|
| | | Water | Oil |
| 0 | 36 | 42 | 22 |
| 1.0 | 20 | 66 | 45 |
| 2.5 | 19 | 54 | 53 |
| 5.0 | 20 | 57 | 53 |
| 100.0 | 18 | 80 | 50 |

[1] Fluorinated diglycidyl ether as weight percent of total diglycidyl ether content.

As with the other resin systems, the fluorinated surfactant monomer causes the surface energy of the resin to be reduced and produces surfaces which are increasingly oil and water repellant.

Even a fluorinated diglycidyl ether of relatively low fluorine content may impact surface properties. The diglycidyl ether

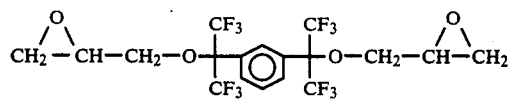

may be blended directly with the diglycidyl ether of bisphenol A and may be cured thermally with ethylene diamine. The surface energies of such mixtures are shown in Table 7.

TABLE 7

| Wt. % Fluoroepoxide[1] | Surface Energy (erg/cm$^2$) |
|---|---|
| 0 | 36 |
| 1.0 | 33 |
| 5.0 | 32 |
| 100.0 | 28 |

[1] Fluorinated diglycidyl ether as weight percent of total diglycidyl ether content.

As with the other resin systems, the surface energy is a non-linear function of fluorinated surfactant monomer content.

We claim:

1. A resin obtained by the reactive curing of a composition comprising a blend of at least one functionalized fluorinated monomer and at least one co-reactive non-fluorinated monomer, said fluorinated monomer being derived from compounds of the formula:

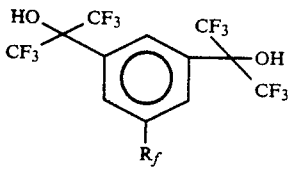

where $R_f$ = H or $C_nF_{2n+1}$ and n = 1 – 18

2. A urethane resin obtained by curing with a polyisocyanate a composition comprising a blend of at least one fluorinated polyol monomer with at least one co-reactive non-fluoridated polyol monomer, said fluorinated polyol being derived from compounds having the formula:

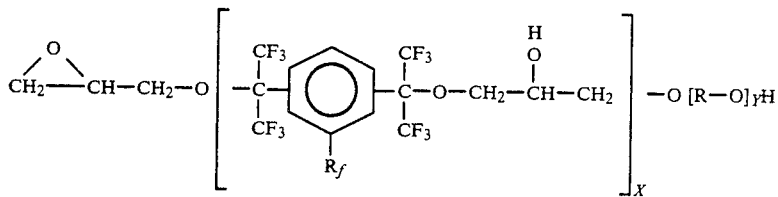

where X + Y = 2 – 16, X ≠ 0 and
where $R_f$ = H or $C_nF_{2n+1}$ for n = 1 – 18
and wherein R is selected from the group consisting of
  (a) an aliphatic radical,
  (b) an aromatic radical,
  (c) a cycloaliphatic radical, and
  (d) a fluorinated radical.

3. A composition according to claim 1, where $R_f = C_6F_{13}$ or $C_8F_{17}$.

4. A composition according to claim 2 wherein said fluorinated monomer is present in an amount of about 0.01 to about 25% by weight.

5. A composition according to claim 4, wherein said fluorinated monomer is present in an amount of about 0.01 to about 10% by weight.

6. A composition according to claim 5, wherein said fluorinated monomer is present in an amount of about 0.1 to about 3% by weight.

7. A composition according to claim 2, wherein R is selected from the group consisting of
  (a) an aliphatic radical of the formula —$(CH_2)_n$— for n = 2 – 8 or —$(CH_2—CHXO)_n$ for n = 1 – 3 and X = H or $CH_3$
  or (b) an aromatic radical derived from resorcinol or bisphenol A,
  or (c) a cycloaliphatic radical derived from cyclohexanediol or cyclohexane-dimethanol,
  or (d) a fluorinated radical, selected from the group consisting of:

—$CH_2(CF_2)_3$—$CH_2$— or —$CH_2CH_2(CF_2$—$CF_2)_n$—$CH_2CH_2$— for n = 1 – 4

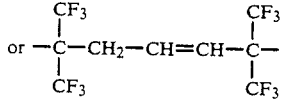

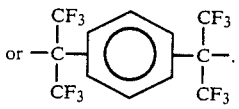

* * * * *